(12) United States Patent
Kim et al.

(10) Patent No.: US 10,886,783 B2
(45) Date of Patent: Jan. 5, 2021

(54) WIRELESS POWER TRANSMISSION APPARATUS

(71) Applicant: WITS Co., Ltd., Yongin-si (KR)

(72) Inventors: Se Joo Kim, Suwon-si (KR); Tae Seok Ko, Suwon-si (KR); Young Woon Choi, Suwon-si (KR); Joung Ho Son, Suwon-si (KR); Doo Young Song, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 166 days.

(21) Appl. No.: 16/159,818

(22) Filed: Oct. 15, 2018

(65) Prior Publication Data

US 2019/0222065 A1 Jul. 18, 2019

(30) Foreign Application Priority Data

Jan. 15, 2018 (KR) .................. 10-2018-0005141
Apr. 12, 2018 (KR) .................. 10-2018-0042772

(51) Int. Cl.
| | | |
|---|---|---|
| *H02J 50/12* | (2016.01) | |
| *H02M 7/5387* | (2007.01) | |
| *H01F 38/14* | (2006.01) | |
| *H02J 7/02* | (2016.01) | |
| *H02M 7/48* | (2007.01) | |
| *H02M 7/487* | (2007.01) | |

(52) U.S. Cl.
CPC .............. *H02J 50/12* (2016.02); *H01F 38/14* (2013.01); *H02M 7/5387* (2013.01); *H02J 7/025* (2013.01); *H02M 7/487* (2013.01); *H02M 2007/4815* (2013.01)

(58) Field of Classification Search
CPC ... H02J 50/12; H02J 7/025; H02J 7/02; H01F 38/14; H02M 7/5387; H02M 7/487; H02M 2007/4815; H02M 7/48
See application file for complete search history.

(56) References Cited

U.S. PATENT DOCUMENTS

| | | |
|---|---|---|
| 2016/0118806 A1 | 4/2016 | Standke et al. |
| 2017/0271923 A1 | 9/2017 | Kim et al. |
| 2018/0233955 A1* | 8/2018 | Park .................. H02J 50/12 |

FOREIGN PATENT DOCUMENTS

| | | |
|---|---|---|
| KR | 10-2015-0085630 A | 7/2015 |
| KR | 10-2017-0107344 A | 9/2017 |

* cited by examiner

*Primary Examiner* — Robert L Deberadinis
(74) *Attorney, Agent, or Firm* — Harness, Dickey & Pierce, P.L.C.

(57) ABSTRACT

A wireless power transmission apparatus includes: an alternating current (AC) power output to convert input power into AC power and output the AC power; and a power transmitter including a plurality of resonators. The power transmitter receives the AC power and wirelessly transmits the AC power in a first operating mode in which two of the resonators are connected in series and the two resonators transmit the AC power, and in a second operating mode in which one of the resonators transmits the AC power.

18 Claims, 12 Drawing Sheets

WIRELESS POWER TRANSMISSION APPARATUS

CROSS-REFERENCE TO RELATED APPLICATIONS

This application claims the benefit under 35 USC 119(a) of Korean Patent Application Nos. 10-2018-0005141 filed on Jan. 15, 2018 and 10-2018-0042772 filed on Apr. 12, 2018 in the Korean Intellectual Property Office, the entire disclosures of which are incorporated herein by reference for all purposes.

BACKGROUND

1. Field

The following description relates to a wireless power transmission apparatus wirelessly transmitting power.

2. Description of the Background

Recently, it has become more common for devices such as mobile terminals to include a wireless charging function has increased. Such a device having a wireless charging function may be disposed in a charging region, that is, a region in which power may be transmitted, on a wireless power transmission apparatus wirelessly transmitting the power, to wirelessly receive the power. When the charging region is widened, a user may more conveniently use the wireless charging function.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmission apparatus includes an alternating current (AC) power output to convert input power into AC power and output the AC power and a power transmitter including a plurality of resonators. The power transmitter receives the AC power and wirelessly transmits the AC power in a first operating mode in which two of the resonators are connected in series and the two resonators transmit the AC power, and in a second operating mode in which one of the resonators transmits the AC power.

Each of the resonators may include a power transmission coil and one end of each power transmission coil may be connected to a neutral point, and a direction of current flowing through each power transmission coil may be a same direction.

The AC power output may be a full-bridge inverter to form an AC voltage between a first node and a second node.

The power transmitter may include a first neutral point switching element connected between the first node and the neutral point, and a second neutral point switching element connected between the second node and the neutral point.

In the first operating mode, the first neutral point switching element and the second neutral point switching element may be off, and in the second operating mode, one of the first neutral point switching element and the second neutral point switching element maybe on, and the other of the first neutral point switching element and the second neutral point switching element may be off.

The power transmission coils may be arranged in a row.

The power transmitter may include a first selection switching element connected between each power transmission coil of a first group and the first node, and a second selection switching element connected between each power transmission coil of a second group and the second node.

In the first operating mode, one first selection switching element and one second selection switching element may be on, and in the second operating mode, one first selection switching element or one second selection switching element may be turned on.

The AC power output may include a common bridge circuit connected to the neutral point and configured to receive the input power and selection bridge circuits, each of which may connected to another end of a respective power transmission coil to receive the input power. In the first operating mode, two selection bridge circuits may be coupled to be operated as a full-bridge circuit, and in the second operating mode, the common bridge circuit and one of the selection bridge circuits may be coupled to be operated as a full-bridge circuit.

In another general aspect, a wireless power transmission apparatus includes an alternating current (AC) power output to convert input power into AC power and output the AC power, and a power transmitter including a first power transmission coil and a second power transmission coil through which currents flow in a same direction. The power transmitter receives the AC power and wirelessly transmits the AC power. When a wireless power reception apparatus is disposed in an intermediate zone between the first power transmission coil and the second power transmission coil, the AC power is applied to a first end of the first power transmission coil and to a first end of the second power transmission coil.

A second end of the first power transmission and a second end of the second power transmission coil may be connected to a neutral point.

The AC power output may be a full-bridge inverter to form an AC voltage between a first node and a second node.

The power transmitter may include a first neutral point switching element connected between the first node and the neutral point, a second neutral point switching element connected between the second node and the neutral point, a first selection switching element connected between the first end of the first power transmission coil and the second node, and a second selection switching element connected between the first end of the second power transmission coil and the first node.

When the wireless power reception apparatus is disposed in the intermediate zone between the first power transmission coil and the second power transmission coil, the first neutral point switching element and the second neutral point switching element may be off, and the first selection switching element and the second selection switching element may be on.

The AC power output may include a common bridge circuit connected to the neutral point to receive the input power, a first selection bridge circuit connected to the second end of the first power transmission coil to receive the input power, and a second selection bridge circuit connected to the second end of the second power transmission coil to receive the input power. When the wireless power reception apparatus is disposed in the intermediate zone between the first power transmission coil and the second power transmission coil, the first selection bridge circuit and the second selection bridge circuit may be coupled to be operated as a full-bridge circuit.

In another general aspect, an apparatus includes a power transmitter including a first power transmission coil and a second power transmission coil to wirelessly transmit power to a power reception apparatus through only the first power transmission coil when the power reception apparatus is disposed in a vicinity of a center of the first power transmission coil, wirelessly transmit power to the power reception apparatus through only the second power transmission coil when the power reception apparatus is disposed in a vicinity of a center of the second power transmission coil, and wirelessly transmit power to the power reception apparatus through both the first power transmission coil and the second power transmission coil while the first power transmission coil and the second power transmission coil are connected so that the direction of the current flowing through the first transmission coil and the direction of the current flowing through the second transmission coil are the same when the power reception apparatus is disposed in an area between the first power transmission coil and the second power transmission coil.

The first power transmission coil may overlap the second power transmission coil.

The first power transmission coil and the second power transmission coil may be arranged to satisfy a condition of B<1.4A, where A is a width of one side of each of the first power transmission coil and the second power transmission coil, and B is a distance between an inner boundary surface of the first power transmission coil and an inner boundary surface of the second power transmission coil in an area in which the first power transmission coil and the second power transmission coil overlap each other.

The first power transmission coil and the second power transmission coil may be arranged to satisfy a condition of B+C<D, where C is an inner diameter of each of the first power transmission coil and the second power transmission coil, and D is an outer diameter of each of the first power transmission coil and the second power transmission coil.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
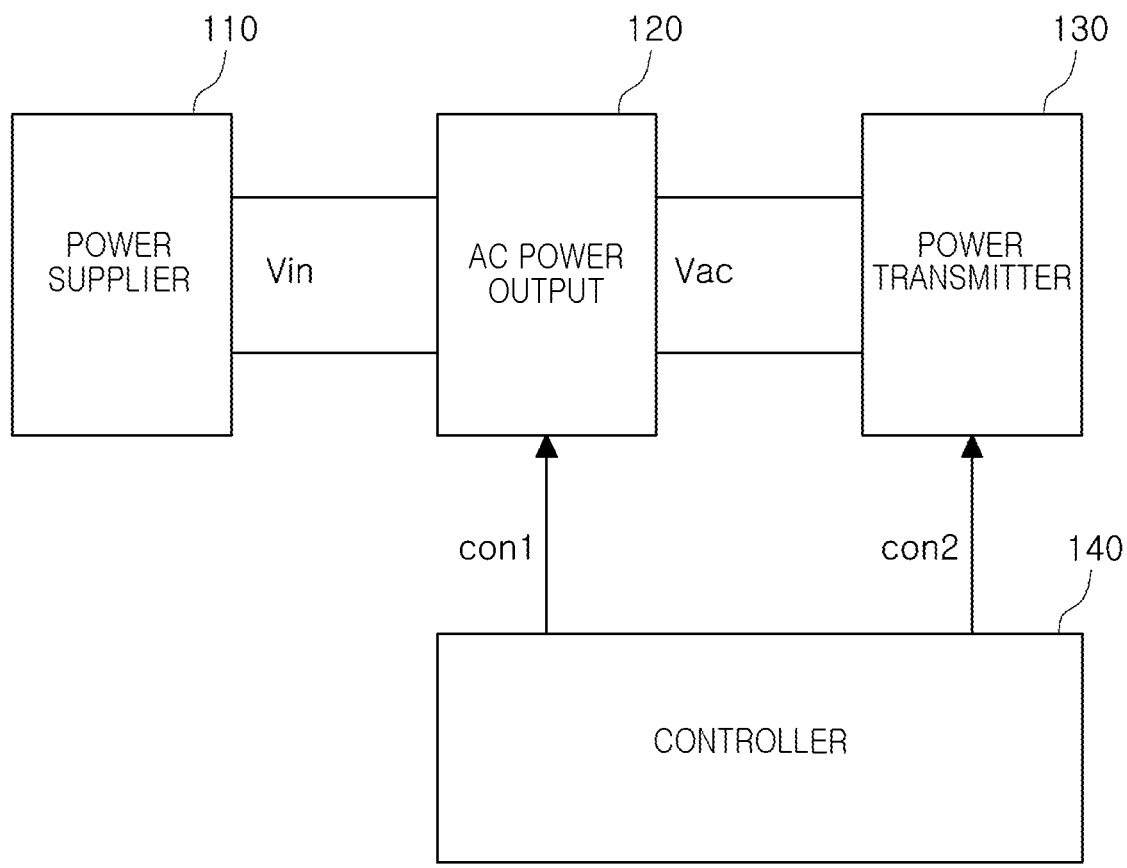
FIG. 1 is a schematic block diagram illustrating a configuration of a wireless power transmission apparatus according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a schematic block diagram illustrating a configuration of a wireless power transmission apparatus according to an example. The wireless power transmission apparatus according to an example may include a power supplier 110, an alternating current (AC) power output 120, a power transmitter 130, and a controller 140.

The power supplier 110 may output input power Vin. The input power may be a direct current (DC) voltage.

The AC power output 120 may convert the input power Vin into AC power Vac, and output the AC power. The AC power output 120 may include an inverter, or the like. A frequency of the AC power Vac may be determined based on the first control signal con1 output by the controller 140.

The power transmitter 130 may receive the AC power Vac, and wirelessly transmit the power. The power transmitter 130 may include a plurality of power transmission coils. The plurality of power transmission coils may transmit the power individually, or two or more power transmission coils may transmit the power together. The power transmitter 130 may include one or more switching elements. A detailed example of the power transmitter 130 will be described below.

The controller 140 may control operations of the AC power output 120 and the power transmitter 130. For example, the controller 140 may output the first control signal con1 for controlling a plurality of switching elements included in the inverter of the AC power output 120 to control a frequency and/or a magnitude of the AC power Vac output from the AC power output 120. The controller 140 may output a second control signal con2 for controlling one or more switching elements of the power transmitter 130. The controller 140 may output the second control signal con2 depending on a position of a wireless power reception apparatus (not illustrated). For example, when the wireless power reception apparatus is disposed in a position corresponding to one of the plurality of power transmission coils, the controller 140 may control the switching elements of the power transmitter 130 so that the AC power is supplied to only that one power transmission coil. This may be considered an operating mode, a first operating mode, or a second operating mode of the power transmitter 130. When the wireless power reception apparatus is disposed in an intermediate zone between at least two of the plurality of power transmission coils, the controller 140 may control the switching elements of the power transmitter 130 so that the AC power is supplied to those at least two power transmission coils. This may be considered an operating mode, a first operating mode, or a second operating mode of the power transmitter 130.

Figure 2:
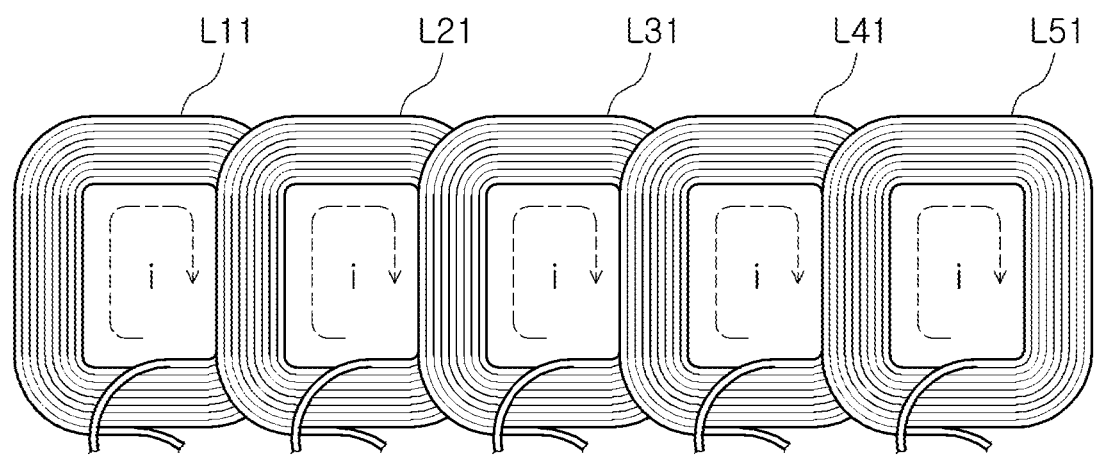
FIGS. 2 and 3 are views illustrating layouts of power transmission coils of wireless power transmission apparatuses according to examples.

FIG. 2 is a view illustrating a layout of power transmission coils of the wireless power transmission apparatus according to an example.

Referring to FIG. 2, a plurality of power transmission coils L11, L21, L31, L41, and L51 may be implemented in a rectangular shape, respectively, and may be arranged in a row. Adjacent coils of the plurality of power transmission coils L11, L21, L31, L41, and L51 may be configured so that winding portions of adjacent coils overlap each other. For example, as illustrated in FIG. 2, the adjacent coils may be arranged so that at least one side of each coil overlaps an adjacent coil.

Currents may flow in the plurality of power transmission coils L11, L21, L31, L41, and L51, such that the power may be wirelessly transmitted. The plurality of power transmission coils L11, L21, L31, L41, and L51 may wirelessly transmit the power individually, or at least two of the plurality of power transmission coils L11, L21, L31, L41, and L51 may wirelessly transmit the power together. In order for at least two coils to transmit the power together, directions of the currents i flowing in the plurality of power transmission coils L11, L21, L31, L41, and L51 may be the same as one another. The plurality of power transmission coils L11, L21, L31, L41, and L51 may be wound and connected to each other so that they generate magnetic fields in the same direction, respectively. In order to use the plurality of power transmission coils L11, L21, L31, L41, and L51 individually or use a combination of at least two coils, one end of each of the plurality of power transmission coils L11, L21, L31, L41, and L51 may be connected to one neutral point.

Figure 3:
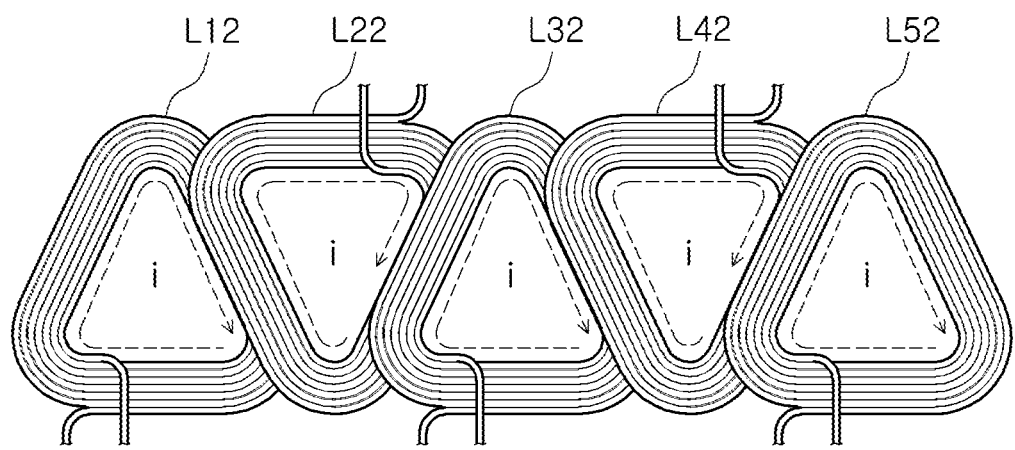

FIG. 3 is a view illustrating a layout of power transmission coils of a wireless power transmission apparatus according to an example.

In FIG. 3, each of a plurality of power transmission coils L12, L22, L32, L42, and L52 is implemented in a triangular shape.

A case in which the wireless power transmission apparatus according to an example includes five power transmission coils is illustrated in FIGS. 2 and 3, but the number of power transmission coils may be varied. In addition, a shape of each of the power transmission coils may be appropriately varied.

Figure 4:
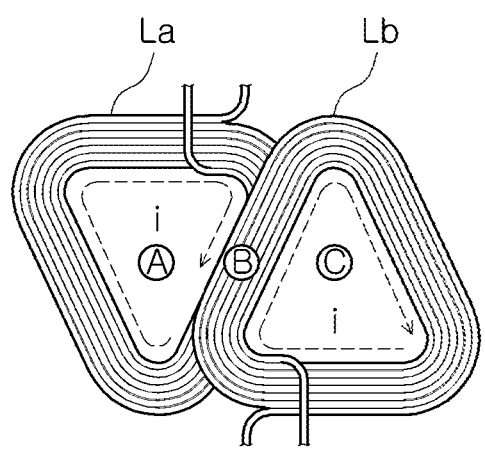
FIG. 4 is a view illustrating operations of a wireless power transmission apparatus according to an example.

FIG. 4 is a view illustrating operations of the wireless power transmission apparatus according to an example. La and Lb of FIG. 4 are adjacent power transmission coils.

A direction of a current flowing in the power transmission coil La and a direction of a current flowing in the power transmission coil Lb may be the same direction.

When the wireless power reception apparatus is disposed in a region A, the wireless power transmission apparatus may allow current to flow in only the power transmission coil La to transmit power to the wireless power reception apparatus. For example, the power transmission coil La may be connected to an AC power output outputting AC power, and the power transmission coil Lb may not be connected to the AC power output, such that power may be transmitted using only the power transmission coil La.

When the wireless power reception apparatus is disposed in a region C, the wireless power transmission apparatus may allow current to flow in only the power transmission coil Lb to transmit power to the wireless power reception apparatus. For example, the power transmission coil Lb may be connected to the AC power output, and the power transmission coil La may not be connected to the AC power output, such that power may be transmitted using only the power transmission coil Lb.

When the wireless power reception apparatus is disposed in a region B, the wireless power transmission apparatus may allow current to flow in both of the power transmission coil La and the power transmission coil Lb to transmit power to the wireless power reception apparatus. One end of the power transmission coil La and one end of the power transmission coil Lb may be connected to one neutral point. The other end of the power transmission coil La and the other end of the power transmission coil Lb are connected to the AC power output, such that power may be transmitted using both of the power transmission coil La and the power transmission coil Lb. Winding directions of each of the power transmission coil La and the power transmission coil Lb may be set so that directions of the currents flowing in the power transmission coil La and the power transmission coil Lb when both of the power transmission coil La and the power transmission coil Lb are connected to the AC power output are the same as each other.

Since the direction of the current flowing in the power transmission coil La and the direction of the current flowing in the power transmission coil Lb are the same direction as each other, a direction of a magnetic field formed when the current flows in the power transmission coil La and a direction of a magnetic field formed when the current flows in the power transmission coil Lb may be the same direction as each other. Therefore, even in the case that the wireless power reception apparatus is present in the region B, which is a region between the power transmission coil La and the power transmission coil Lb, the wireless power transmission apparatus may allow currents to flow in both of the power transmission coil La and the power transmission coil Lb to transmit the power to the wireless power reception apparatus. The wireless power transmission apparatus according to an example may wirelessly transmit power without having a dark zone, even in the case that an additional power transmission coil is not installed between the power transmission coil La and the power transmission coil Lb.

Figure 5:
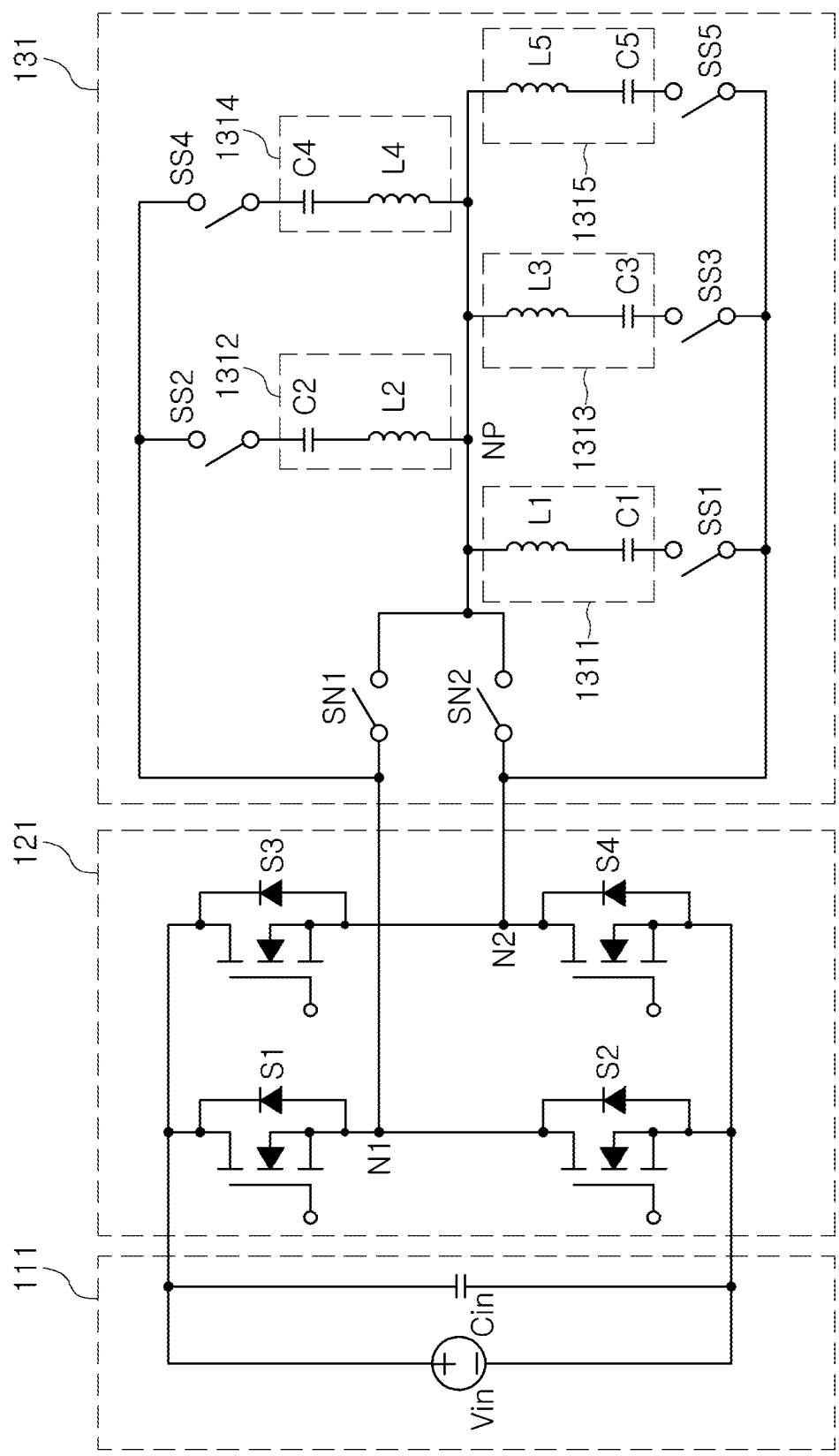
FIG. 5 is a schematic circuit diagram illustrating a configuration of a wireless power transmission apparatus according to an example.
Figure 6A:
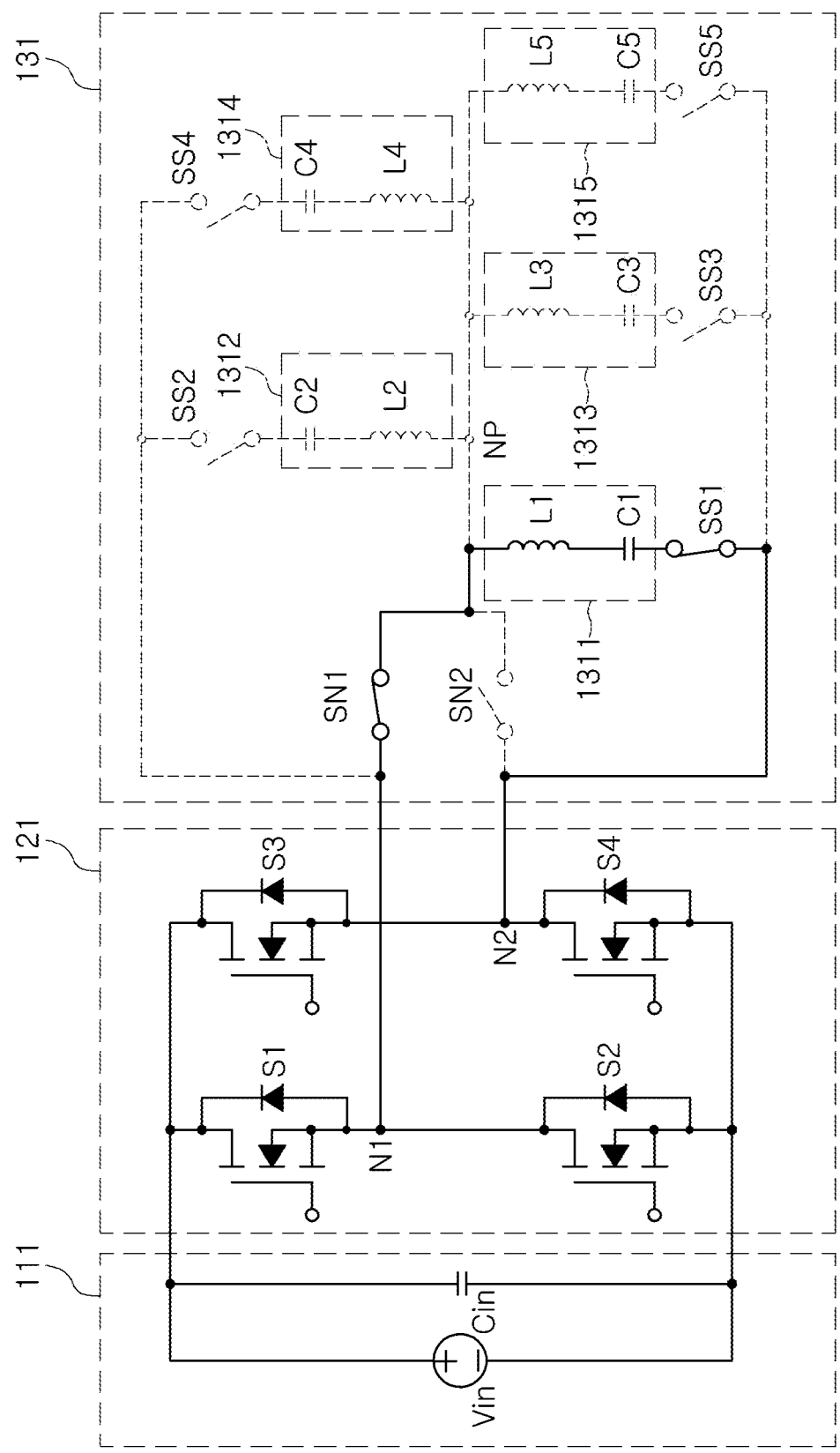
FIGS. 6A through 6C are circuit diagrams illustrating operations of the wireless power transmission apparatus illustrated in FIG. 5.
Figure 6B:
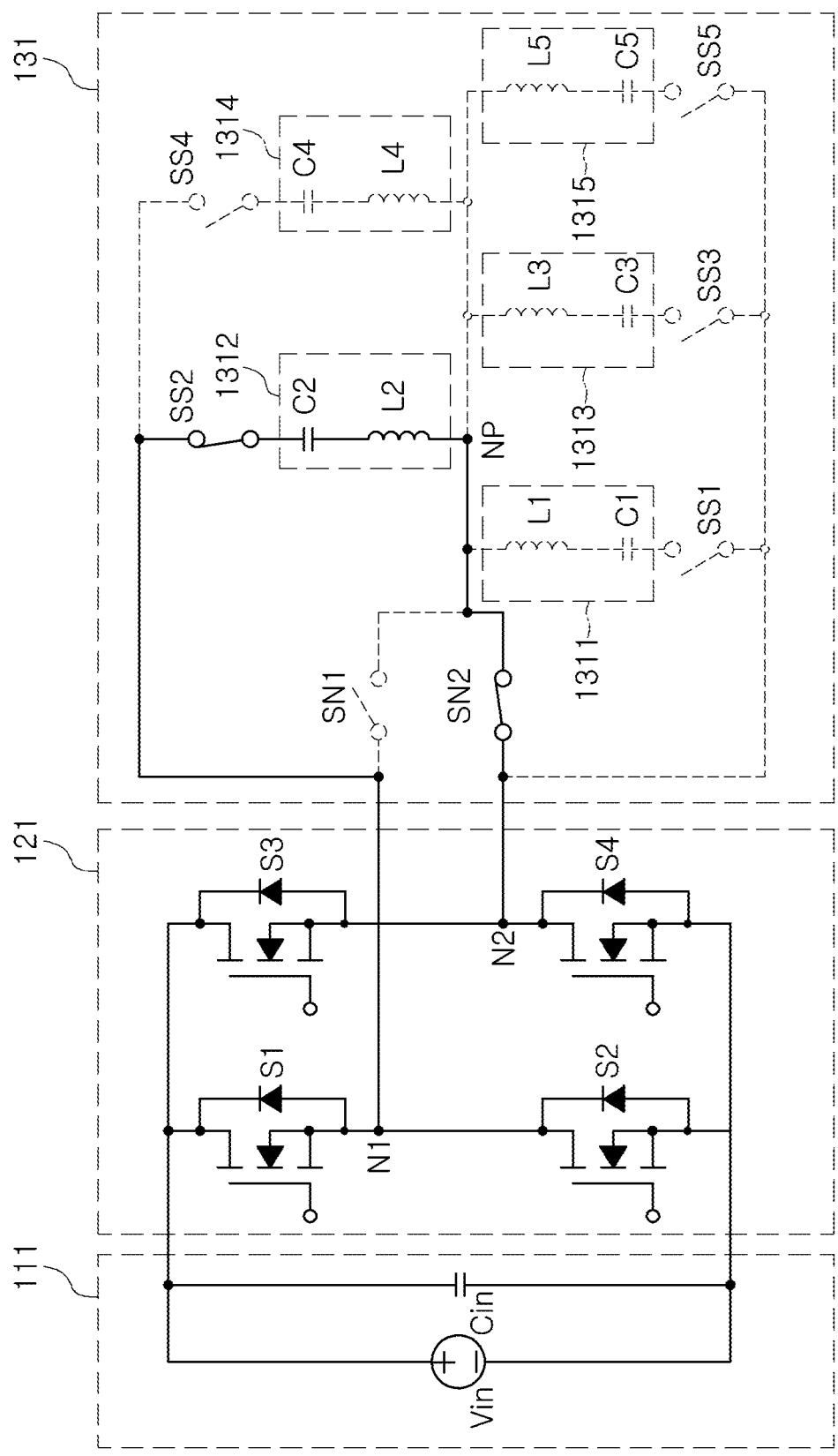
Figure 6C:
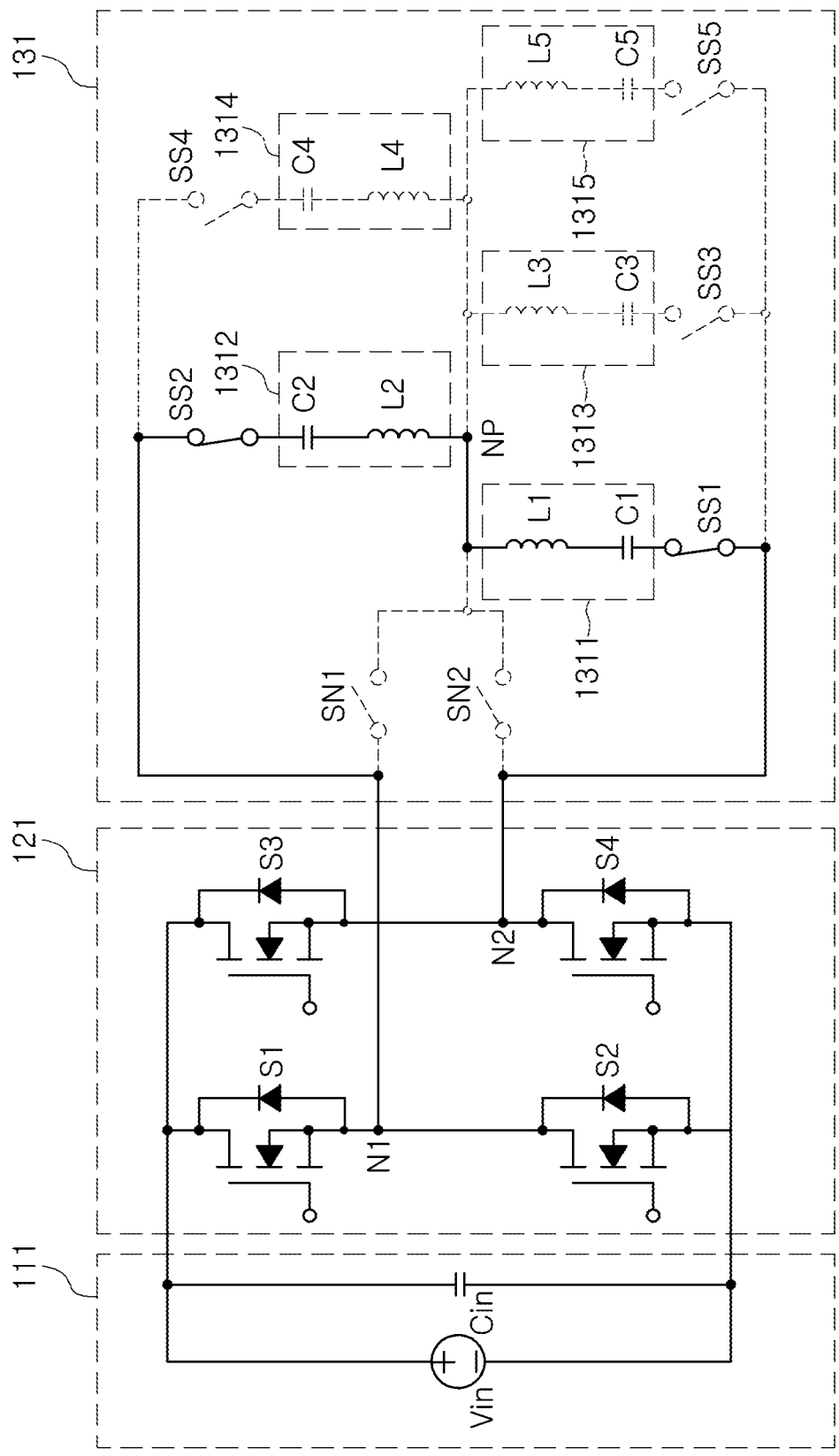

FIG. 5 is a schematic circuit diagram illustrating a configuration of a wireless power transmission apparatus according to an example. The wireless power transmission apparatus may include a power supplier 111, an AC power output 121, and a power transmitter 131. In addition, FIGS. 6A through 6C are circuit diagrams illustrating operations of the wireless power transmission apparatus illustrated in FIG. 5.

The power supplier 111 may output input power Vin. The input power Vin may be a DC voltage. As illustrated in FIG. 5, the power supplier 111 may include a power supply outputting the input power Vin and an input capacitor Cin connected to the power supply in parallel. The power supply may include a battery, an adaptor converting power input from an external source into the input power, or the like.

The AC power output 121 may convert the input power Vin into AC power, and output the AC power. As illustrated in FIG. 5, the AC power output 121 may include a full-bridge inverter. That is, the AC power output 121 may include a first conversion switching element S1 connected between a terminal to which the input power Vin is applied and a first node N1, a second conversion switching element S2 connected between the first node N1 and a ground, a third conversion switching element S3 connected between the terminal to which the input power Vin is applied and a second node N2, and a fourth conversion switching element S4 connected between the second node N2 and the ground. The AC power may be output to the first node N1 and the second node N2.

The power transmitter 131 may receive the AC power, and wirelessly transmit the power. The power transmitter 131 may include a plurality of power transmission coils L1, L2, L3, L4, and L5, a plurality of resonant capacitors C1, C2, C3, C4, and C5, a plurality of selection switching elements SS1, SS2, SS3, SS4, and SS5, and a switch unit connected between a neutral point NP and output terminals, that is, the first node N1 and the second node N2, of the AC power output 121. The switch unit may include a first neutral point switching element SN1 connected between the first node N1 and the neutral point NP and a second neutral point switching element SN2 connected between the second node N2 and the neutral point NP.

The plurality of power transmission coils L1, L2, L3, L4, and L5 and the plurality of resonant capacitors C1, C2, C3, C4, and C5 may constitute a plurality of resonant units 1311, 1312, 1313, 1314, and 1315, respectively. That is, a first power transmission coil L1 and a first resonant capacitor C1 may be connected to each other in series to constitute a first resonant unit (resonator) 1311, a second power transmission coil L2 and a second resonant capacitor C2 may be connected to each other in series to constitute a second resonant unit (resonator) 1312, a third power transmission coil L3 and a third resonant capacitor C3 may be connected to each other in series to constitute a third resonant unit (resonator) 1313, a fourth power transmission coil L4 and a fourth resonant capacitor C4 may be connected to each other in series to constitute a fourth resonant unit (resonator) 1314, and a fifth power transmission coil L5 and a fifth resonant capacitor C5 may be connected to each other in series to constitute a fifth resonant unit (resonator) 1315. All of the plurality of power transmission coils L1, L2, L3, L4, and L5 may have the same inductance, and all of the plurality of resonant capacitors C1, C2, C3, C4, and C5 may have the same capacitance.

The plurality of power transmission coils L1, L2, L3, L4, and L5 may have the same shape as the shapes described with reference to FIG. 2 or FIG. 3, and may be arranged as described with reference to FIG. 2 or FIG. 3. That is, the plurality of power transmission coils L1, L2, L3, L4, and L5 may be arranged in a row in a sequence of the first power transmission coil L1, the second power transmission coil L2, the third power transmission coil L3, the fourth power transmission coil L4, and the fifth power transmission coil L5, and directions of currents flowing through the plurality of power transmission coils L1, L2, L3, L4, and L5 may be the same as one another. A shape of each of the plurality of power transmission coils L1, L2, L3, L4, and L5 may be variously implemented, and the number of power transmission coils L1, L2, L3, L4, and L5 may be varied.

One end of each of the plurality of power transmission coils L1, L2, L3, L4, and L5 of the first to fifth resonant units 1311 to 1315 may be connected to the neutral point NP.

Odd-numbered power transmission coils L1, L3, and L5 of the plurality of power transmission coils L1, L2, L3, L4, and L5 may be connected to the second node N2 through the selection switching elements SS1, SS3 and SS5, and even-numbered power transmission coils L2 and L4 of the plurality of power transmission coils L1, L2, L3, L4, and L5 may be connected to the first node N1 through the selection switching elements SS2 and SS4.

The first selection switching element SS1 may be connected between the first resonant unit 1311, which includes the first power transmission coil L1, and the second node N2, the second selection switching element SS2 may be connected between the second resonant unit 1312, which includes the second power transmission coil L2, and the first node N1, the third selection switching element SS3 may be connected between the third resonant unit 1313, which includes the third power transmission coil L3, and the second node N2, the fourth selection switching element SS4 may be connected between the fourth resonant unit 1314, which includes the fourth power transmission coil L4, and the first node N1, and the fifth selection switching element SS5 may be connected between the fifth resonant unit 1315, which includes the fifth power transmission coil L5, and the second node N2.

The first neutral point switching element SN1 may be connected between the neutral point NP and the first node N1. The second neutral point switching element SN2 may be connected between the neutral point NP and the second node N2.

The wireless power transmission apparatus may determine a power transmission coil that is to transmit the power by appropriately turning on/off the switching elements SS1, SS2, SS3, SS4, SS5, SN1, and SN2 of the power transmitter 130. For example, when the wireless power reception apparatus is disposed in the vicinity of the center of the first power transmission coil L1, such that the wireless power transmission apparatus is to transmit power through the first power transmission coil L1, the first selection switching element SS1 and the first neutral point switching element SN1 may be turned on, and the other switching elements SS2, SS3, SS4, SS5, and SN2 may be turned off, as illustrated in FIG. 6A. In this example, only the first resonant unit 1311 may be activated and used to transmit power, and the other resonant units 1312, 1313, 1314, and 1315 may be inactivated and not operated.

When the wireless power reception apparatus is disposed in the vicinity of the center of the second power transmission coil L2, such that the wireless power transmission apparatus is to transmit power through the second power transmission coil L2, the second selection switching element SS2 and the second neutral point switching element SN2 may be turned on, and the other switching elements SS1, SS3, SS4, SS5, and SN1 may be turned off, as illustrated in FIG. 6B. In this example, only the second resonant unit 1312 may be activated and used to transmit power, and the other resonant units 1311, 1313, 1314, and 1315 may be inactivated and not operated.

When the wireless power reception apparatus is disposed in an intermediate zone between the first power transmission coil L1 and the second power transmission coil L2, such that the wireless power transmission apparatus is to transmit power through the first power transmission coil L1 and the second power transmission coil L2, the first selection switching element SS1 and the second selection switching element SS2 may be turned on, and the other switching elements SS3, SS4, SS5, SN1, and SN2 may be turned off, as illustrated in FIG. 6C. In this example, the first resonant unit 1311 and the second resonant unit 1312 may be activated and used to transmit power, and the other resonant units 1313, 1314, and 1315 may be inactivated and not operated. The power transmission coils L1 and L2 may have the same inductance, and the resonant capacitors C1 and C2 may have the same capacitance. As illustrated in FIG. 6C, the first resonant unit 1311 and the second resonant unit 1312 may be connected to each other in series. Therefore, a resonant frequency of a resonant unit formed by coupling the first resonant unit 1311 and the second resonant unit 1312 to each other may become equal to that of each of the resonant units 1311, 1312, 1313, 1314, and 1315.

Although not illustrated in FIG. 5, the wireless power transmission apparatus may further include a controller controlling the switching elements S1, S2, S3, S4, SN1, SN2, SS1, SS2, SS3, SS4, and SS5.

Figure 7:
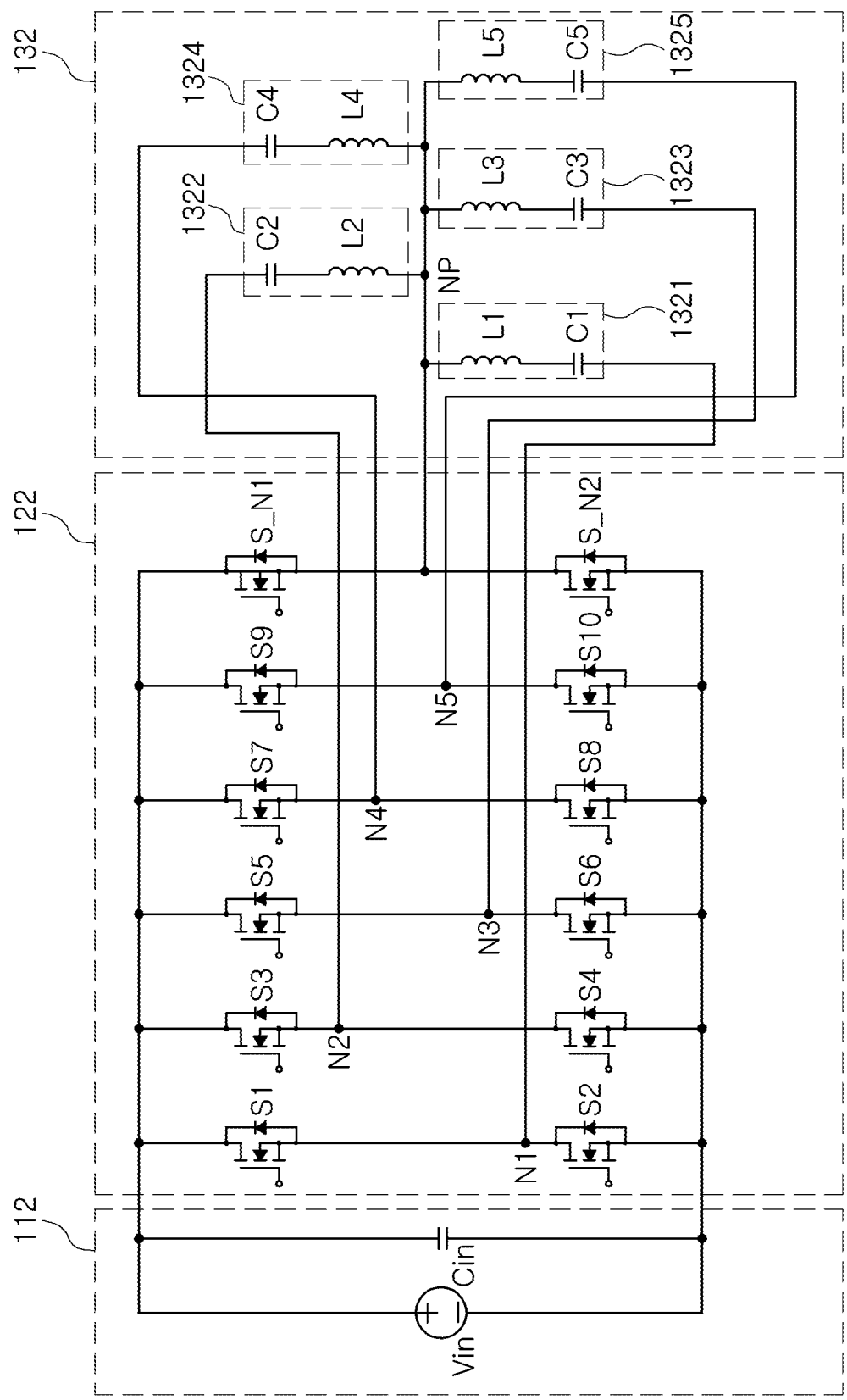
FIG. 7 is a schematic circuit diagram illustrating a configuration of a wireless power transmission apparatus according to an example.
Figure 8A:
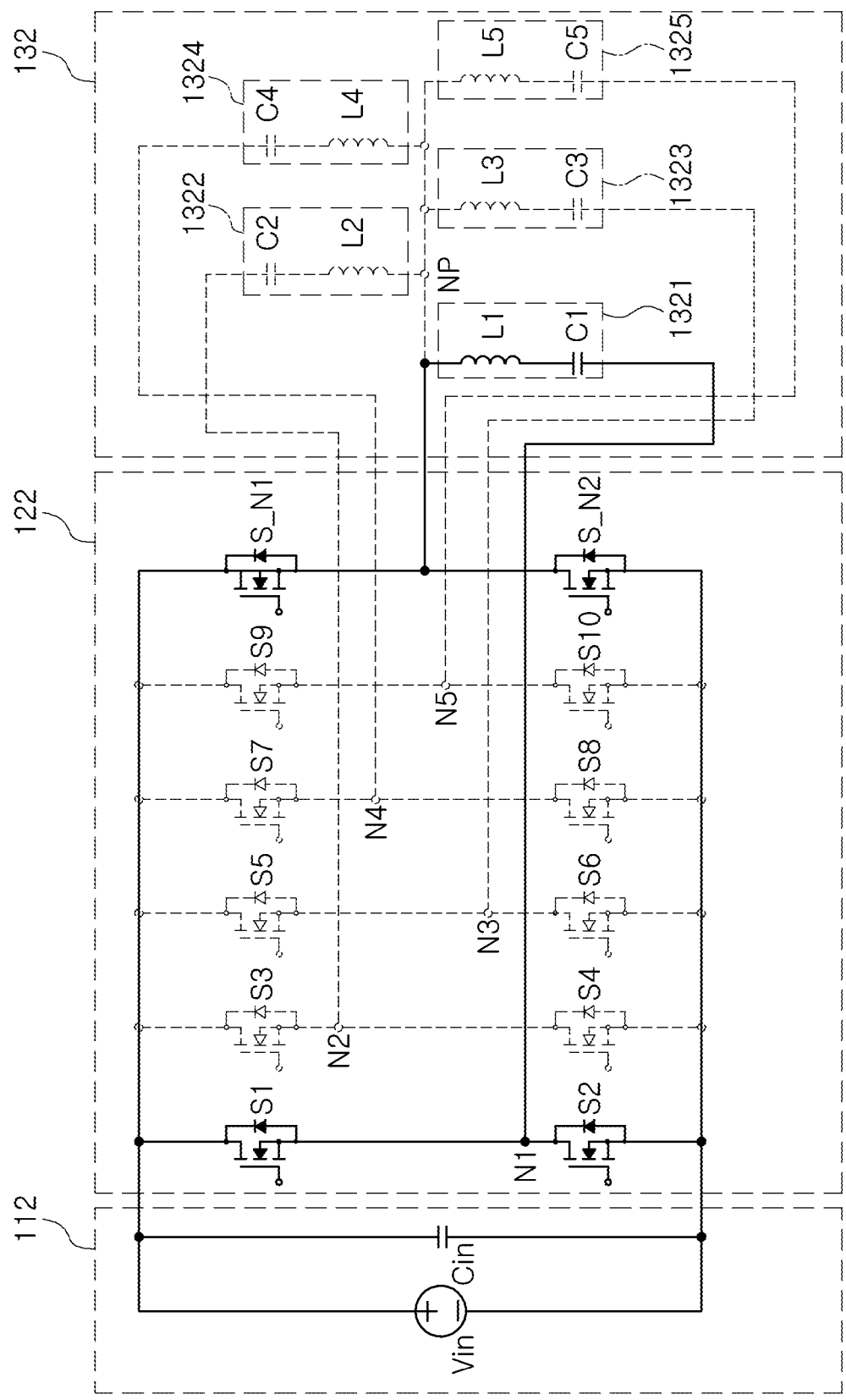
FIGS. 8A through 8C are circuit diagrams illustrating operations of the wireless power transmission apparatus illustrated in FIG. 7.
Figure 8B:
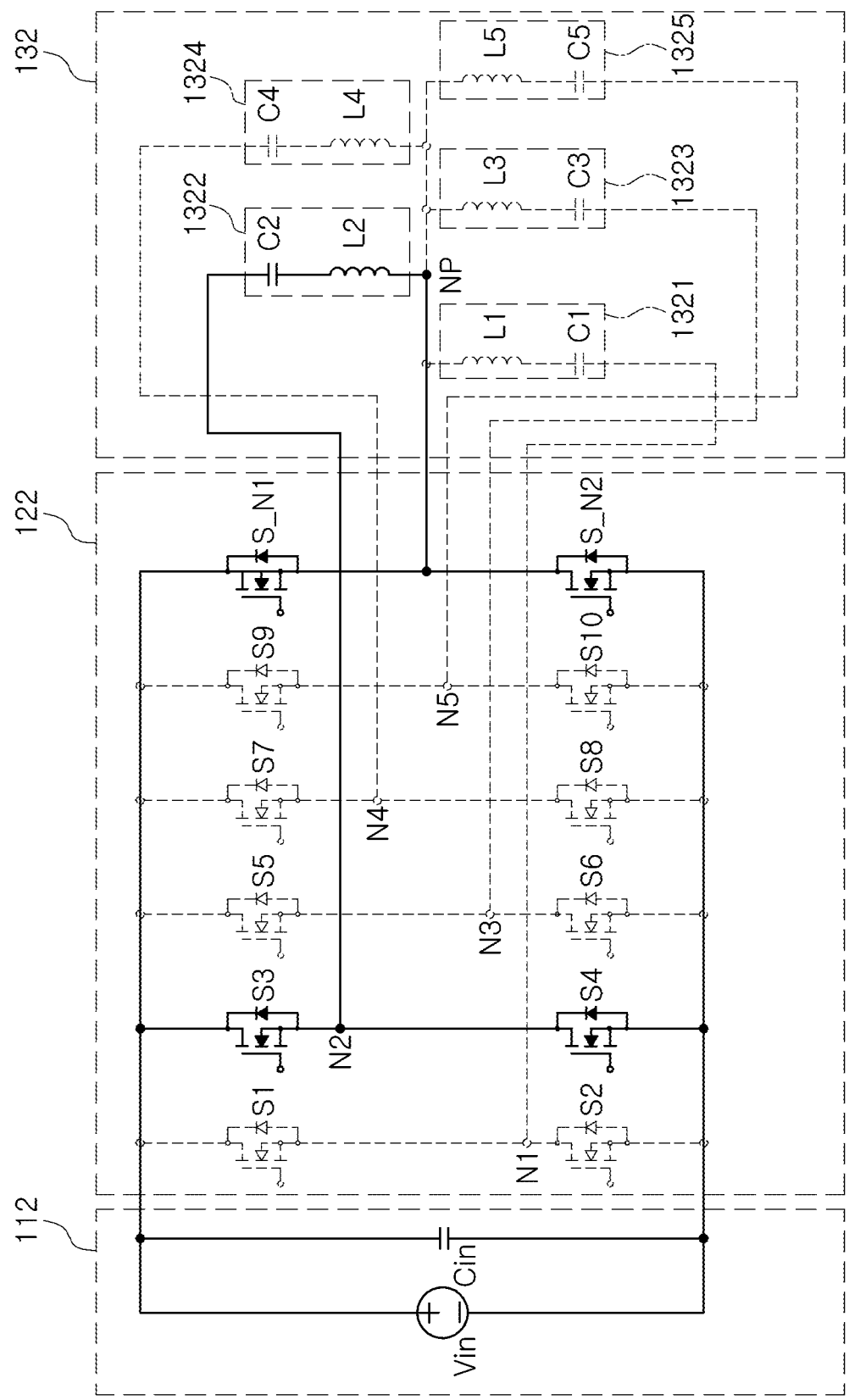
Figure 8C:
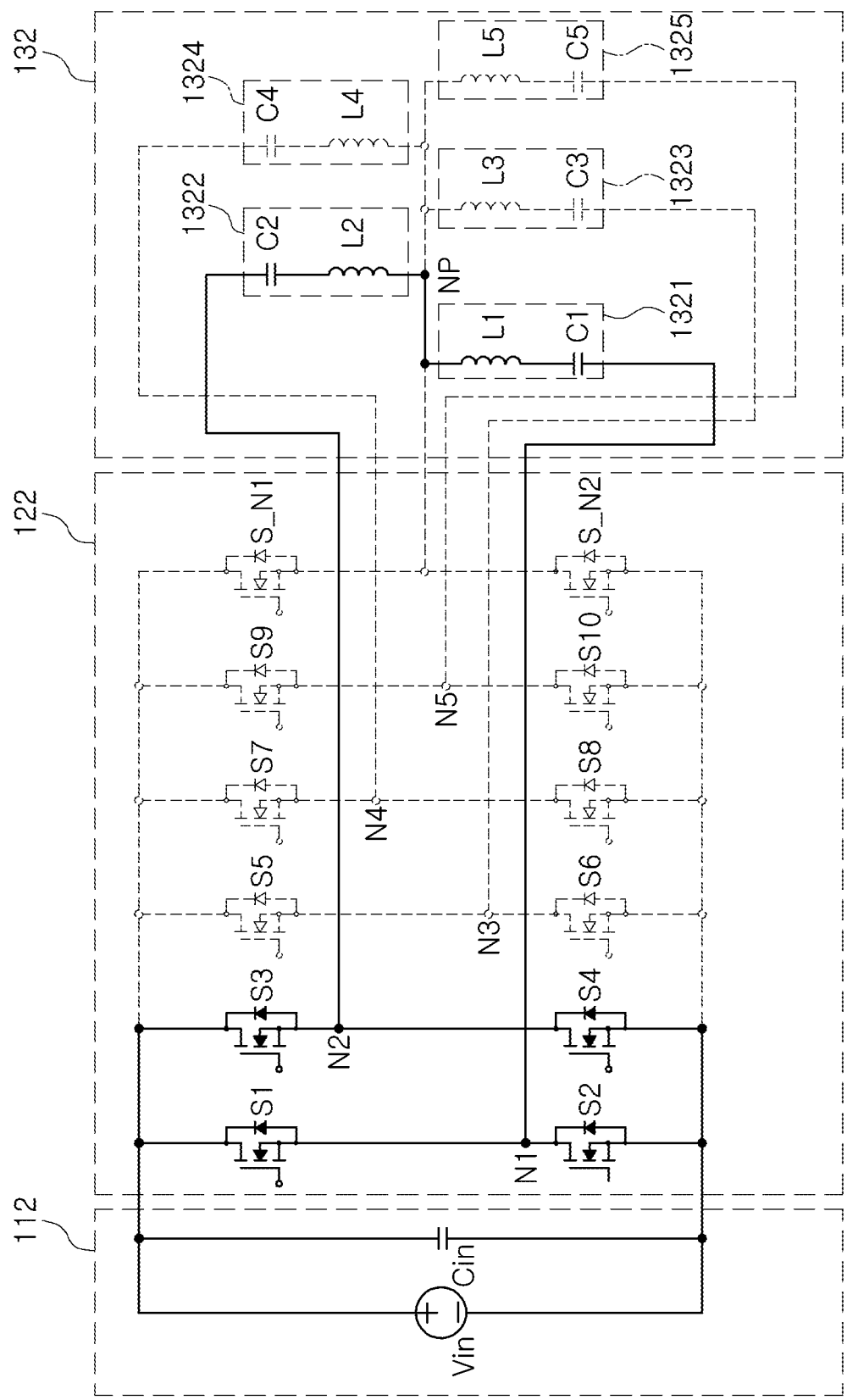

FIG. 7 is a schematic circuit diagram illustrating a configuration of a wireless power transmission apparatus according to an example. The wireless power transmission apparatus may include a power supplier 112, an AC power output 122, and a power transmitter 132. In addition, FIGS. 8A through 8C are circuit diagrams illustrating operations of the wireless power transmission apparatus illustrated in FIG. 7.

The power supplier 112 may output input power Vin. The input power Vin may be a DC voltage. As illustrated in FIG. 7, the power supplier 112 may include a power supply outputting the input power Vin and an input capacitor Cin connected to the power supply in parallel. The power supply may include a battery, an adaptor converting power input from an external source into the input power, or the like.

The AC power output 122 may convert the input power Vin into AC power, and output the AC power. The AC power output 122 may include a first conversion switching element S1 connected between a terminal to which the input power Vin is applied and a first node N1, a second conversion switching element S2 connected between the first node N1 and a ground, a third conversion switching element S3 connected between the terminal to which the input power Vin is applied and a second node N2, a fourth conversion switching element S4 connected between the second node N2 and the ground, a fifth conversion switching element S5 connected between the terminal to which the input power Vin is applied and a third node N3, a sixth conversion switching element S6 connected between the third node N3 and the ground, a seventh conversion switching element S7 connected between the terminal to which the input power Vin is applied and a fourth node N4, an eighth conversion switching element S8 connected between the fourth node N4 and the ground, a ninth conversion switching element S9 connected between the terminal to which the input power Vin is applied and a fifth node N5, a tenth conversion switching element S10 connected between the fifth node N5 and the ground, a first neutral point switching element S_1 connected between the terminal to which the input power Vin is applied and a neutral point NP, and a second neutral point switching element S_2 connected between the neutral point NP and the ground. The AC power may be output to at least two of the first node N1, the second node N2, the third node N3, the fourth node N4, the fifth node N5, and the neutral point NP.

The AC power output 122 may include a plurality of bridge circuits, but may be operated as a full-bridge circuit including two bridge circuits at a specific point in time. The first neutral point switching element S_1 and the second neutral point switching element S_2 may constitute a common bridge circuit, the first conversion switching element S1 and the second conversion switching element S2 may constitute a first selection bridge circuit, the third conversion switching element S3 and the fourth conversion switching element S4 may constitute a second selection bridge circuit, the fifth conversion switching element S5 and the sixth conversion switching element S6 may constitute a third selection bridge circuit, the seventh conversion switching element S7 and the eighth conversion switching element S8 may constitute a fourth selection bridge circuit, and the ninth conversion switching element S9 and the tenth conversion switching element S10 may constitute a fifth selection bridge circuit. One of the selection bridge circuits and the common bridge circuit may be coupled to each other to be operated as a full-bridge circuit, or two of the selection bridge circuits may be coupled to each other to be operated as a full-bridge circuit.

The power transmitter 132 may receive the AC power, and wirelessly transmit the power. The power transmitter may include a plurality of power transmission coils L1, L2, L3, L4, and L5 and a plurality of resonant capacitors C1, C2, C3, C4, and C5.

The plurality of power transmission coils L1, L2, L3, L4, and L5 and the plurality of resonant capacitors C1, C2, C3, C4, and C5 may constitute a plurality of resonant units 1321, 1322, 1323, 1324, and 1325, respectively. A first power transmission coil L1 and a first resonant capacitor C1 may be connected to each other in series to constitute a first resonant unit 1321, a second power transmission coil L2 and a second resonant capacitor C2 may be connected to each other in series to constitute a second resonant unit 1322, a third power transmission coil L3 and a third resonant capacitor C3 may be connected to each other in series to constitute a third resonant unit 1323, a fourth power transmission coil L4 and a fourth resonant capacitor C4 may be connected to each other in series to constitute a fourth resonant unit 1324, and a fifth power transmission coil L5 and a fifth resonant capacitor C5 may be connected to each other in series to constitute a fifth resonant unit 1325. All of the plurality of power transmission coils L1, L2, L3, L4, and L5 may have the same inductance, and all of the plurality of resonant capacitors C1, C2, C3, C4, and C5 may have the same capacitance.

The plurality of power transmission coils L1, L2, L3, L4, and L5 may have the same shape as the shapes described with reference to FIG. 2 or FIG. 3, and may be arranged as described with reference to FIG. 2 or FIG. 3. The plurality of power transmission coils L1, L2, L3, L4, and L5 may be arranged in a row in a sequence of the first power transmission coil L1, the second power transmission coil L2, the third power transmission coil L3, the fourth power transmission coil L4, and the fifth power transmission coil L5, and directions of currents flowing through the plurality of power transmission coils L1, L2, L3, L4, and L5 may be the same as one another. A shape of each of the plurality of power transmission coils L1, L2, L3, L4, and L5 may be variously implemented, and the number of power transmission coils L1, L2, L3, L4, and L5 may be varied.

One end of each of the plurality of power transmission coils L1, L2, L3, L4, and L5 of the first to fifth resonant units may be connected to the neutral point NP.

One end of the first resonant unit 1321, which includes the first power transmission coil L1, may be connected to the first node N1, one end of the second resonant unit 1322, which includes the second power transmission coil L2, may be connected to the second node N2, one end of the third resonant unit 1323, which includes the third power transmission coil L3, may be connected to the third node N3, one end of the fourth resonant unit 1324, which includes the fourth power transmission coil L4, may be connected to the fourth node N4, and one end of the fifth resonant unit 1325, which includes the fifth power transmission coil L5, may be connected to the fifth node N5.

The wireless power transmission apparatus may determine a power transmission coil that is to transmit power by appropriately turning on/off the switching elements S1, S2, S3, S4, S5, S6, S7, S8, S9, S10, S_1, and S_N2 of the AC power output 122. For example, when the wireless power reception apparatus is disposed in the vicinity of the center of the first power transmission coil L1, such that the wireless power transmission apparatus is to transmit power through the first power transmission coil L1, the first conversion switching element S1, the second conversion switching element S2, the first neutral point switching element S_1, and the second neutral point switching element S_N2 may be operated as a full-bridge inverter, and the other switching elements may be maintained in a turn-off state, as illustrated in FIG. 8A. In this example, only the first resonant unit 1321 may be activated and used to transmit power, and the other resonant units 1322, 1323, 1324, and 1325 may be inactivated and not operated.

When the wireless power reception apparatus is disposed in the vicinity of the center of the second power transmission coil L2, such that the wireless power transmission apparatus is to transmit power through the second power transmission coil L2, the third conversion switching element S3, the fourth conversion switching element S4, the first neutral point switching element S_1, and the second neutral point switching element S_N2 may be operated as a full-bridge inverter, and the other switching elements may be maintained in a turn-off state, as illustrated in FIG. 8B. In this example, only the second resonant unit 1322 may be activated and used to transmit power, and the other resonant units 1321, 1323, 1324, and 1325 may be inactivated and not operated.

When the wireless power reception apparatus is disposed in an intermediate zone between the first power transmission coil L1 and the second power transmission coil L2, such that the wireless power transmission apparatus is to transmit power through the first power transmission coil L1 and the second power transmission coil L2, the first conversion switching element S1, the second conversion switching element S2, the third conversion switching element S3, and the fourth conversion switching element S4 may be operated as a full-bridge inverter, and the other switching elements may be maintained in a turn-off state, as illustrated in FIG. 8C. In this example, the first resonant unit 1321 and the second resonant unit 1322 may be activated and used to transmit power, and the other resonant units 1323, 1324, and 1325 may be inactivated and not operated. The power transmission coils L1 and L2 may have the same inductance, and the resonant capacitors C1 and C2 may have the same capacitance. As illustrated in FIG. 8C, the first resonant unit 1321 and the second resonant unit 1322 may be connected to each other in series. Therefore, a resonant frequency of a resonant unit formed by coupling the first resonant unit 1321 and the second resonant unit 1322 to each other may become equal to that of each of the resonant units 1321, 1322, 1323, 1324, and 1325.

Figure 9A:
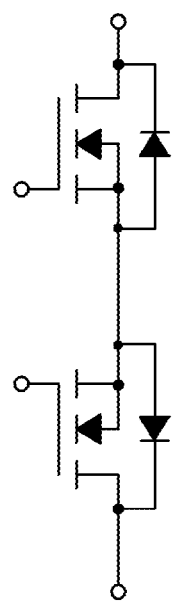
FIGS. 9A through 9C are views illustrating switching elements of wireless power transmission apparatuses according to examples, including the examples illustrated in FIG. 5 and FIG. 7.
Figure 9B:
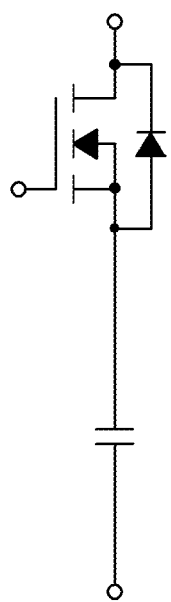
Figure 9C:
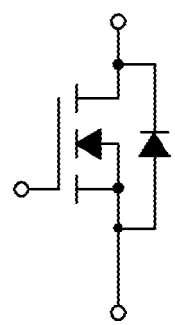

FIGS. 9A through 9C are views illustrating examples of switching elements of the wireless power transmission apparatus according to the examples illustrated in FIG. 5 and FIG. 7. Each of the switching elements SS1, SS2, SS3, SS4, SS5, SN1, and SN2 (see FIG. 5) and S_1 and S_N2 (see FIG. 7) may be implemented by a relay switch or any one of several semiconductor switches illustrated in FIGS. 9A through 9C.

For example, each of the switching elements SS1, SS2, SS3, SS4, SS5, SN1, and SN2 (FIG. 5) and S_1 and S_N2 (FIG. 7) may be a back-to-back switch in which two semiconductor switching elements are connected to each other, as illustrated in FIG. 9A. Each of the switching elements SS1, SS2, SS3, SS4, SS5, SN1, and SN2 (FIG. 5) and S_1 and S_N2 (FIG. 7) may be a switch in which one semiconductor switching element and a capacitor are connected to each other in series, as illustrated in FIG. 9B. An AC signal may be more efficiently blocked through these configurations.

In a case of the selection switching elements SS1, SS2, SS3, SS4, and SS5 (FIG. 5), a resonant capacitor of a resonant unit to which the selection switching element is connected may serve as the capacitor of FIG. 9B. Therefore, each of the selection switching elements SS1, SS2, SS3, SS4, and SS5 (FIG. 5) may also be implemented by one semiconductor switching element, as illustrated in FIG. 9C.

Figure 10:
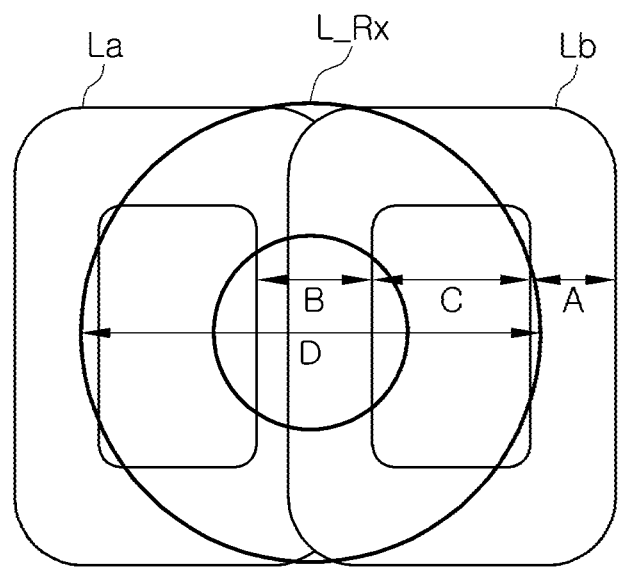
FIG. 10 is a view illustrating a layout of adjacent power transmission coils in a wireless power transmission apparatus according to an example.

FIG. 10 is a view illustrating a layout of adjacent power transmission coils in a wireless power transmission apparatus according to an example.

In FIG. 10, La and Lb represent power transmission coils arranged adjacent to each other, and L_Rx represents a power reception coil receiving power. In addition, A refers to a width of one side of the power transmission coil, B refers to a distance between an inner boundary surface of the power transmission coil La and an inner boundary surface of the power transmission coil Lb in a portion in which the power transmission coil La and the power transmission coil Lb overlap each other, C refers to an inner diameter of the power transmission coil, and D refers to an outer diameter of the power reception coil.

The power transmission coils La and Lb may be arranged so that at least portions of winding portions of the coils overlap each other. The power transmission coils La and Lb may be arranged so that they do not completely overlap each other. The power transmission coils La and Lb may be arranged so that an internal space (a space inside the inner boundary surface) of the power transmission coil La and an internal space of the power transmission coil Lb do not overlap each other.

The power transmission coils La and Lb may be arranged to satisfy a condition of B<1.4A.

The power transmission coils La and Lb may be arranged to additionally satisfy a condition of B+C<D.

Figure 11:
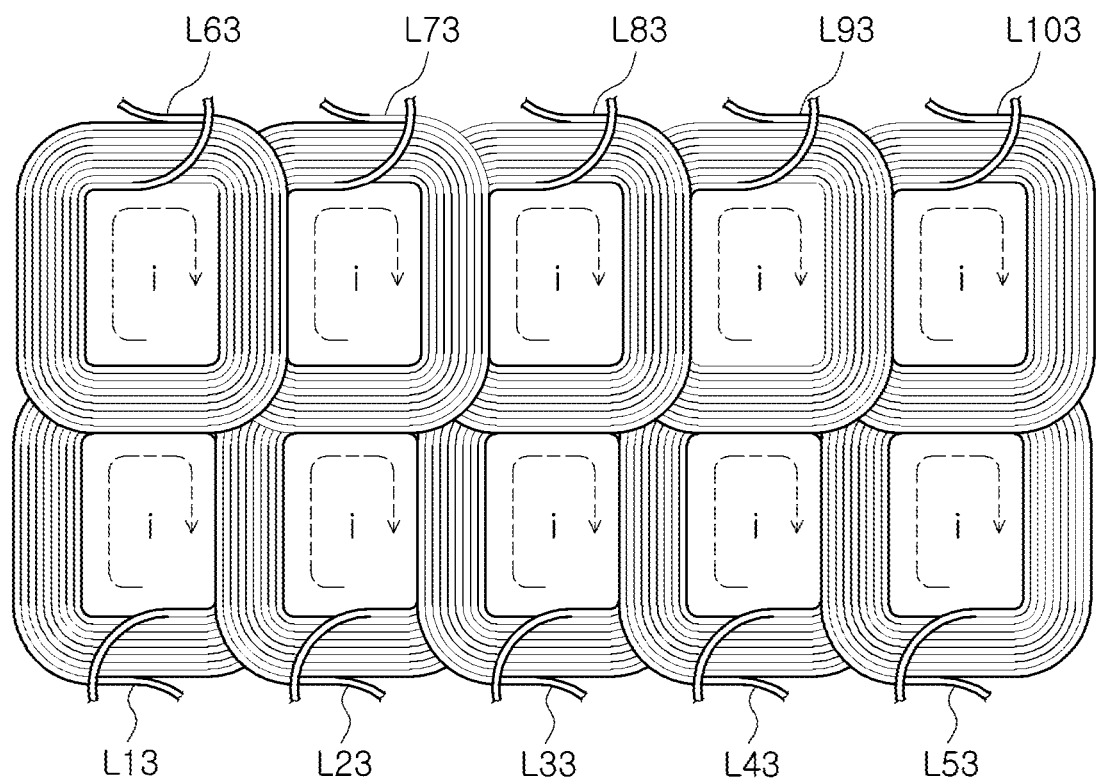
FIG. 11 is a view illustrating a layout of power transmission coils of a wireless power transmission apparatus according an example.

FIG. 11 is a view illustrating an example of a layout of power transmission coils of a wireless power transmission apparatus according to an example.

As illustrated in FIG. 11, the wireless power transmission apparatus may include power transmission coils L13, L23, L33, L43, L53, L63, L73, L83, L93, and L103 arranged in two lines.

Although not illustrated, the wireless power transmission apparatus according to the example may also include power transmission coils arranged in three or more lines.

A wireless power transmission apparatus according to any of the examples may form a wide charging region without forming a dark zone, using a smaller number of power transmission coils and a smaller number of switching elements. Therefore, convenience of a user may be improved, and a cost required for manufacturing the wireless power transmission apparatus may be reduced.

The controller 140 in FIG. 1 that performs the operations described in this application is implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmission apparatus comprising:
   an alternating current (AC) power output configured to convert input power into AC power and output the AC power; and
   a power transmitter comprising resonators and configured to
   receive the AC power,
   wirelessly transmit the AC power in a first operating mode in which two of the resonators are connected in series and the two of the resonators wirelessly transmit the AC power, and
   wirelessly transmit the AC power in a second operating mode in which one of the resonators wirelessly transmits the AC power.

2. The wireless power transmission apparatus of claim 1, wherein
   each of the resonators comprises a power transmission coil and one end of each power transmission coil is connected to a neutral point, and
   a direction of current flowing through each power transmission coil is a same direction.

3. The wireless power transmission apparatus of claim 2, wherein the AC power output is a full-bridge inverter configured to form an AC voltage between a first node and a second node.

4. The wireless power transmission apparatus of claim 3, wherein the power transmitter further comprises
   a first neutral point switching element connected between the first node and the neutral point, and
   a second neutral point switching element connected between the second node and the neutral point.

5. The wireless power transmission apparatus of claim 4, wherein
   in the first operating mode, the first neutral point switching element and the second neutral point switching element are off, and
   in the second operating mode, one of the first neutral point switching element and the second neutral point switching element is on, and the other of the first neutral point switching element and the second neutral point switching element is off.

6. The wireless power transmission apparatus of claim 3, wherein the power transmission coils are arranged in a row.

7. The wireless power transmission apparatus of claim 6, wherein the power transmitter further comprises
   a first selection switching element connected between each power transmission coil of a first group and the first node, and
   a second selection switching element connected between each power transmission coil of a second group and the second node.

8. The wireless power transmission apparatus of claim 7, wherein
   in the first operating mode, one first selection switching element and one second selection switching element are on, and
   in the second operating mode, one first selection switching element or one second selection switching element is on.

9. The wireless power transmission apparatus of claim 2, wherein
   the AC power output comprises
   a common bridge circuit connected to the neutral point and configured to receive the input power, and
   selection bridge circuits, each of which is connected to another end of a respective power transmission coil and configured to receive the input power, in the first operating mode, two selection bridge circuits are coupled to be operated as a full-bridge circuit, and in the second operating mode, the common bridge circuit and one of the selection bridge circuits are coupled to be operated as a full-bridge circuit.

10. A wireless power transmission apparatus comprising:

an alternating current (AC) power output configured to convert input power into AC power and output the AC power; and a power transmitter comprising a first power transmission coil and a second power transmission coil through which currents flow in a same direction and configured to receive the AC power and to wirelessly transmit the AC power, wherein, in response to a wireless power reception apparatus being disposed in an intermediate zone between the first power transmission coil and the second power transmission coil, the AC power is applied to a first end of the first power transmission coil and to a first end of the second power transmission coil, wherein the AC power output is a full-bridge inverter configured to form an AC voltage between a first node and a second node.

11. The wireless power transmission apparatus of claim 10, wherein a second end of the first power transmission coil and a second end of the second power transmission coil are connected to a neutral point.

12. The wireless power transmission apparatus of claim 11, wherein the power transmitter further comprises a first neutral point switching element connected between the first node and the neutral point, a second neutral point switching element connected between the second node and the neutral point, a first selection switching element connected between the first end of the first power transmission coil and the second node, and a second selection switching element connected between the first end of the second power transmission coil and the first node.

13. The wireless power transmission apparatus of claim 12, wherein, in response to the wireless power reception apparatus being disposed in the intermediate zone between the first power transmission coil and the second power transmission coil, the first neutral point switching element and the second neutral point switching element are off, and the first selection switching element and the second selection switching element are on.

14. The wireless power transmission apparatus of claim 11, wherein the AC power output comprises a common bridge circuit connected to the neutral point and configured to receive the input power;

a first selection bridge circuit connected to the second end of the first power transmission coil and configured to receive the input power; and a second selection bridge circuit connected to the second end of the second power transmission coil and configured to receive the input power, wherein, in response to the wireless power reception apparatus being disposed in the intermediate zone between the first power transmission coil and the second power transmission coil, the first selection bridge circuit and the second selection bridge circuit are coupled to be operated as a full-bridge circuit.

15. An apparatus comprising:

an alternating current (AC) power output configured to convert input power into AC power and output the AC power; and a power transmitter comprising a first power transmission coil and a second power transmission coil and configured to wirelessly transmit the AC power to a power reception apparatus through only the first power transmission coil in a case in which the power reception apparatus is disposed in a vicinity of a center of the first power transmission coil, wirelessly transmit the AC power to the power reception apparatus through only the second power transmission coil in a case in which the power reception apparatus is disposed in a vicinity of a center of the second power transmission coil, and wirelessly transmit the AC power to the power reception apparatus through both the first power transmission coil and the second power transmission coil while the first power transmission coil and the second power transmission coil are connected so that a direction of a current flowing through the first power transmission coil and a direction of a current flowing through the second power transmission coil are same in a case in which the power reception apparatus is disposed in an area between the first power transmission coil and the second power transmission coil, wherein the AC power output is a full-bridge inverter configured to form an AC voltage between a first node and a second node.

16. The apparatus of claim 15, wherein the first power transmission coil overlaps the second power transmission coil.

17. The apparatus of claim 16, wherein the first power transmission coil and the second power transmission coil are arranged to satisfy a condition of B<1.4A, where A is a width of one side of each of the first power transmission coil and the second power transmission coil, and B is a distance between an inner boundary surface of the first power transmission coil and an inner boundary surface of the second power transmission coil in an area in which the first power transmission coil and the second power transmission coil overlap each other.

18. The apparatus of claim 17, wherein the first power transmission coil and the second power transmission coil are arranged to satisfy a condition of B+C<D, where C is an inner diameter of each of the first power transmission coil and the second power transmission coil, and D is an outer diameter of each of the first power transmission coil and the second power transmission coil.

* * * * *